(12) United States Patent
Nainar et al.

(10) Patent No.: US 11,811,622 B2
(45) Date of Patent: Nov. 7, 2023

(54) CROSS SUB-DOMAIN MANAGEMENT OF SERVICE LEVEL OBJECTIVES

(71) Applicant: Cisco Technology, Inc., San Jose, CA (US)

(72) Inventors: Nagendra Kumar Nainar, Morrisville, NC (US); Carlos M. Pignataro, Cary, NC (US); David John Zacks, Vancouver (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/463,807

(22) Filed: Sep. 1, 2021

(65) Prior Publication Data

US 2023/0062502 A1    Mar. 2, 2023

(51) Int. Cl.
  *H04L 41/5009* (2022.01)
  *H04L 41/5025* (2022.01)

(52) U.S. Cl.
  CPC ...... *H04L 41/5009* (2013.01); *H04L 41/5025* (2013.01)

(58) Field of Classification Search
  None
  See application file for complete search history.

(56) References Cited

U.S. PATENT DOCUMENTS

| | | | |
|---|---|---|---|
| 11,245,701 B1 * | 2/2022 | Brandwine | H04L 63/20 |
| 11,354,150 B1 * | 6/2022 | Guo | H04L 41/082 |
| 2010/0223217 A1 * | 9/2010 | Little | G06Q 10/10 |
| | | | 709/224 |
| 2016/0087856 A1 | 3/2016 | Groenendijk et al. | |
| 2016/0116954 A1 * | 4/2016 | Zhuang | G06F 1/324 |
| | | | 713/300 |
| 2017/0005856 A1 * | 1/2017 | Thomas | H04L 67/535 |
| 2017/0339027 A1 | 11/2017 | Barrett | |
| 2020/0052979 A1 | 2/2020 | Clemm et al. | |

(Continued)

OTHER PUBLICATIONS

Youtube video titled "SREcon 16—Service Levels and Error Budgets," 23 minutes 1 second, uploaded May 25, 2016 by user "USENIX". Retrieved from the Internet: <URL: https://www.youtube.com/watch?v=iOoxtpVBQ4I>. (Year: 2016).*

*Primary Examiner* — Kevin T Bates
*Assistant Examiner* — Dae Kim
(74) *Attorney, Agent, or Firm* — Edell, Shapiro & Finnan, LLC

(57) ABSTRACT

Aggregation of cross domain service level indications provide an estimate of available end to end error budget within a service chain of a network system. In some embodiments, service level indications are obtained from a plurality of sub-domains, and aggregated to determine an end to end reliability score. The end to end reliability score is then distributed one or more of the sub-domains. The sub-domains then consider whether to implement a change based on local service level indications as well as the end to end reliability score. In other embodiments, a sub-domain requests approval to implement a change from an error manager. The error manager consults the end to end reliability score to determine whether adequate margin exists in the service chain to allow the change to occur, while still meeting service level objectives of the service chain. The error manager conditionally approves the request based on the determination.

17 Claims, 9 Drawing Sheets

(56) References Cited

U.S. PATENT DOCUMENTS

| | | | |
|---|---|---|---|
| 2020/0067773 A1 | 2/2020 | Abes et al. | |
| 2020/0244546 A1* | 7/2020 | Tidemann | H04L 41/5006 |
| 2020/0366569 A1* | 11/2020 | White | H04L 41/5009 |
| 2021/0328863 A1* | 10/2021 | A | H04L 41/0803 |
| 2022/0070050 A1* | 3/2022 | D'Ippolito | H04L 41/0609 |

* cited by examiner

US 11,811,622 B2

CROSS SUB-DOMAIN MANAGEMENT OF SERVICE LEVEL OBJECTIVES

TECHNICAL FIELD

The present disclosure relates to management of a network system, and specifically, to management of the network system to ensure service level objectives (SLOs) are achieved.

BACKGROUND

With the introduction of Site Reliability Engineering (SRE), Service Level Indicators (SLI) are used to measure different characteristics of a service offering. These are in turn used to quantify an availability and the overall quality of the service offering. A development operations (DevOps) group may use SLIs and/or SLOs via a closed-loop mechanism to facilitate decisions on whether to push new features or network paths to a managed network system.

DESCRIPTION OF EXAMPLE EMBODIMENTS

Overview

Figure 1:
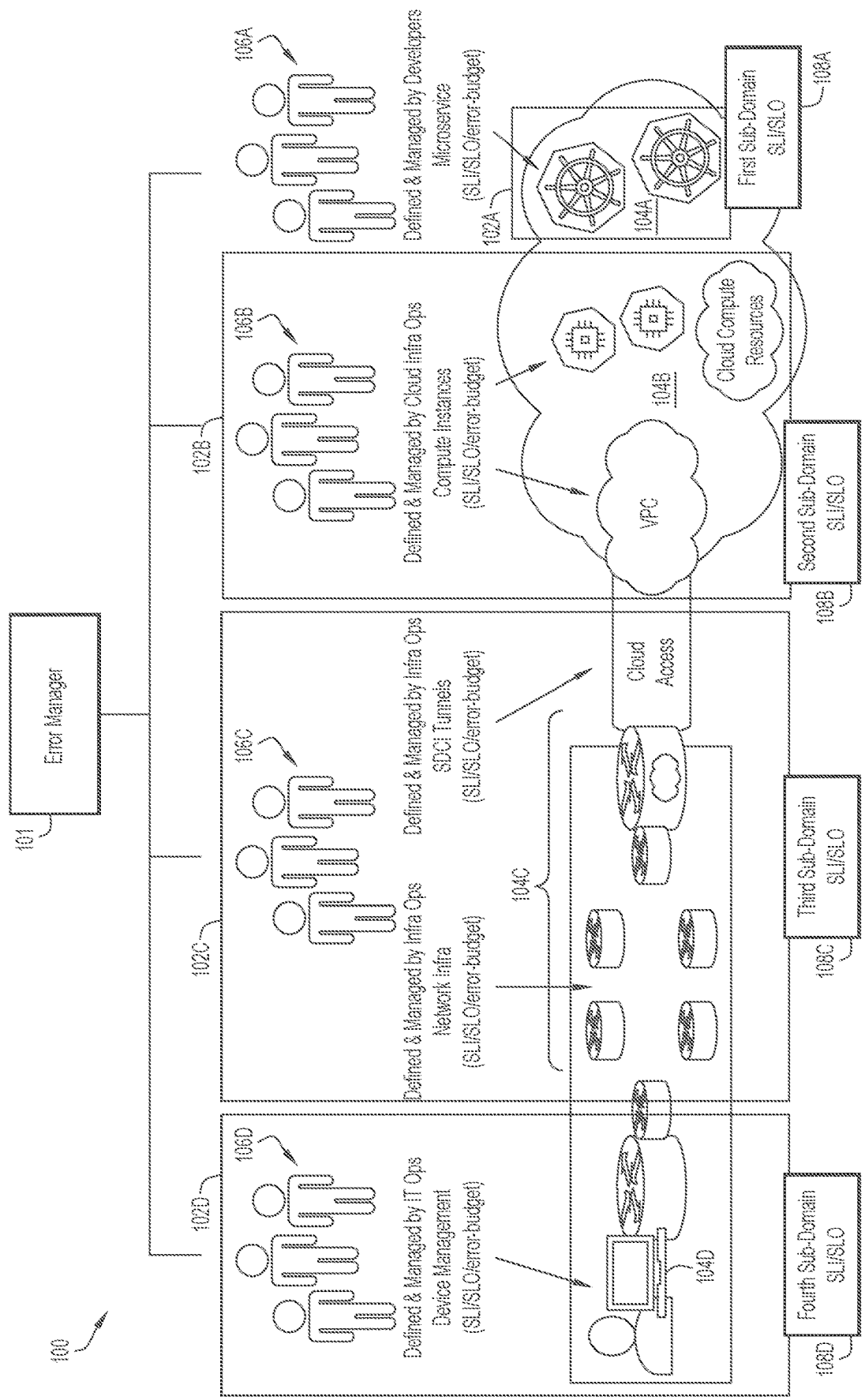
FIG. 1 is an overview diagram illustrating management sub-domains within portions of an end to end service chain of a network system, according to an example embodiment.

Disclosed are methods for aggregating cross domain service level indications to estimate an available end to end error budget for a service chain within a network system. In one form, a method includes obtaining, from a first sub-domain included in an end to end service chain of a network system, a first measurement of performance of the first sub-domain; obtaining, from a second sub-domain included in the end to end service chain, a second measurement of performance of the second sub-domain, aggregating the first measurement and the second measurement, determining an estimated performance of the end to end service chain based on the aggregating, and conditionally modifying the network system based on the estimated performance.

In some embodiments of the method, the aggregating of the first measurement and the second measurement includes adjusting the first measurement by a first weight assigned to the first sub-domain and adjusting the second measurement by a second weight assigned to the second sub-domain. In some of these embodiments, the method also includes determining a remaining error budget of the end to the service chain based on the estimated performance, and providing, to the first sub-domain, the remaining error budget to the first sub-domain.

In some embodiments of the method, the first measurement and the second measurement are associated with a predefined time window, and the conditionally modifying occurs within the predefined time window. In some embodiments of the method, the first measurement is based on a first plurality of operational parameter values of the first sub-domain, and the second measurement is based on a second plurality of operational parameter values of the second sub-domain, the first plurality of operational parameter values being different from the second plurality of operational parameter values. Some embodiments of the method also include providing the estimated performance of the end to end service chain to the first sub-domain.

In some embodiments of the method, the first sub-domain utilizes a first normalization method to generate the first measurement and the second sub-domain utilizes a second normalization method to generate the second measurement. In some embodiments of the method, the conditional modifying the network system includes selectively authorizing an installation or upgrade of a software component within the first sub-domain based on the estimated performance.

Some embodiments of the method also include obtaining or receiving, from the first sub-domain, a first request to reduce a first performance of the first sub-domain; and conditionally granting the first request based on the estimated performance. In some of these embodiments, the first request indicates an amount of reduction in the first performance of the first sub-domain, and the method further comprises comparing the amount of reduction to the estimated performance, and wherein the conditionally granting is based on the comparing. Some embodiments of the method also include obtaining or receiving, from the second sub-domain, a second request to reduce a second performance of the second sub-domain, wherein the conditionally granting of the first request is further based on the second request.

EXAMPLE EMBODIMENTS

As discussed above, SLIs and SLOs are used by at least some DevOps teams to determine whether to initiate a change in a network system. For example, an SLI can be defined to measure a number of dropped incoming requests. This SLI is then compared against a defined error budget for the number of dropped requests. If the SLI meets a criterion (e.g., falls within a predefined range defined by an SLO), a determination is made, in some embodiments, to push a new feature or a patch to the network system. This decision is justified, at least in part, in some embodiments, based on adequate margin between the SLI and a minimum requirement for the SLI (as defined by the criterion), such that any reduction in performance caused by the push of the new feature or patch will not cause violation of the corresponding SLO. In some cases, behavior of the network system is monitored and if the SLI degrades to a degree larger than anticipated, the new feature is rolled out of the production environment before the SLO is violated. In many existing implementations, error budgeting definitions and measurements relating to a SLO are performed at a sub-domain level (e.g., as part of the infrastructure), and thus, definitions of SLI/SLO operate at a sub-domain/layer/application-specific level. Thus, each sub-domain is siloed with respect to conditions in other sub-domains. A sub-domain in this context may be a network sub-domain, such as an administrative grouping of one or more computer networks. A sub-domain, in some embodiments, is a portion of an end to end service chain that is managed and controlled by a distinct organizational entity or group. In some embodiments, a sub-domain is a portion of an end to end service chain that provides routing of data over a portion of the end to end service chain. A plurality of sub-domains are then collectively responsible for routing of data from a first end of the end to end service chain to a second end of the end to end service chain.

The disclosed embodiments improve upon these siloed systems by integrating SLI/SLO based characterizations of a plurality of sub-domains, so as to determine a characterization of performance of an end to end (E2E) service path. An E2E service path can include, for example, a path through a network system from an end-user device to an application service providing a service, via the network, to the end user. The characterization of performance is represented, in some embodiments, by an E2E reliability score. The E2E reliability score represents, in some embodiments, a percentage of a performance margin or an error budget remaining before the E2E service chain violates an SLO established for the service chain.

The E2E reliability score is generated based on SLI and/or SLO information of each sub-domain within the respective service chain. Each sub-domain, in at least some embodiments, characterizes its own performance, via a unique group of SLIs and/or SLO information. In an example embodiment, a first sub-domain includes, a latency SLO, and thus determines a latency SLI from which to characterize performance of the first sub-domain. A second sub-domain is less concerned with latency in this example embodiment, and instead characterizes its performance based on CPU utilization, and thus defines a SLI and/or SLO to determine if the CPU utilization is meeting requirements. Note that in this example embodiment, the first sub-domain's performance characterization does not include CPU utilization, and the second sub-domain's performance characterization does not include latency. When characterizing performance of an E2E service chain that includes the first sub-domain and the second sub-domain, the first sub-domain's characterization of performance based on latency is integrated with the second sub-domain's characterization of performance based on CPU utilization. To integrate the two somewhat different performance characterizations, the performance characterizations are normalized into a common reference plane, such that the performance characterizations can be aggregated and/or compared when generating the E2E reliability score.

In some embodiments, the E2E reliability score is then provided back to each of the sub-domains within the service chain. Each sub-domain then consults the E2E reliability score when performing change management. The sharing of the E2E reliability score eliminates the siloing of sub-domains present in existing implementations discussed above, in that each sub-domain considers (or is made aware of) a condition of the overall E2E service chain's performance when determining whether to increase the risk of further performance degradation by, for example, installing, removing, or upgrading a hardware or software component included in the sub-domain.

FIG. 1 is an overview diagram illustrating management of sub-domains within portions of an E2E service chain of a network system 100, according to an example embodiment. FIG. 1 illustrates different sub-domains of the network system 100 being managed by different implementation and operations teams. Each sub-domain utilizes a different SLI/SLO definition, and each sub-domain may be managed by a different team or administrative group. Traditionally, each team makes decisions independently based on defined SLI/SLO definitions within their area of responsibility, and generally without regard for performance of other sub-domains, having different SLI/SLO definitions, and managed by other teams.

In the example embodiment of FIG. 1, a first sub-domain 102A includes a network application 104A that is structured as one or more micro services and managed by software developers 106A. The SLI/SLO definitions and error budgets 108A of the first sub-domain 102A are tailored to characterize the network application 104A availability and performance. For example, in some embodiments, a SLI/SLO is defined based on a latency of the network application 104A when responding to a request, a number of dropped requests, or a combination of these or other parameters. Whether the first sub-domain 102A is meeting its SLI/SLO requirements is then used to determine whether a new feature or new canary version of the network application 104A can be installed/upgraded within a given time window. For example, the first sub-domain 102A determines, in some embodiments, a percentage or amount of an error budget utilized by the first sub-domain 102A with a given time period. Thus, for example, if an SLI indicates 100 milliseconds of latency, and a SLO for the first sub-domain 102A defines latency is to remain under 200 milliseconds within a given time period, then the characterization of first sub-domain 102A performance indicates, in some embodiments, that 50% of the error budget remains, and/or there is 100 milliseconds remaining within the given time period before the SLO is violated.

A second sub-domain 102B includes cloud infrastructure 104B and is managed by a cloud infrastructure team 106B. A second set of SLI/SLO parameters and/or error budgets 108B are defined to characterize performance of the cloud infrastructure 104B. The second set of SLI/SLO parameters and/or error budgets 108B are utilized by the cloud infrastructure team 106B to determine whether to, for example, upgrade the cloud infrastructure 104B. A third sub-domain 102C includes network infrastructure 104C and is managed by a network infrastructure team 106C. A third set of SLI/SLO parameters and/or error budgets 108C are defined to characterize performance of the network infrastructure 104C, and relied upon by the network infrastructure team 106C to determine whether there is sufficient performance margin to make changes to the network infrastructure 104C (e.g., such as upgrading a tunnel or other network infrastructure). A fourth sub-domain 102D includes end user devices 104D such as employee laptops or other end user devices. The fourth sub-domain 102D is managed by an IT team 106D. Performance of the fourth sub-domain 102D is measured based on a fourth set of SLI/SLO parameters and/or error budgets 108D, which are also evaluated to determine whether there is adequate performance margin to make changes to one or more components of the fourth sub-domain 102D.

In traditional implementations, error budget definition, measurements of SLIs, and characterization of performance of a sub-domain are performed on a per sub-domain basis, with a resulting lack of end to end visibility. This presents several challenges. As one example, if FIG. 1 represented a traditional implementation, a remaining error budget (within a given time window) of the network application 104A (e.g., a micro service), under some circumstances, reaches a critical level, any disruptions caused by upgrades or other modifications could have a high probability of affecting a user application experience. This can be the case even if a remaining error budget (within the given time window) of the third sub-domain 102C is well within its own error budget. Thus, because the network infrastructure team 106C is only considering performance of the third sub-domain 102C based on the third set of SLI/SLO parameters and/or error budgets 108C, the network infrastructure team 106C moves forward with changes within the third sub-domain 102C (during the given time window), potentially resulting in the E2E service chain violating its SLOs. The modification by the third sub-domain 102C may also result in the second sub-domain 102B violating its performance requirements as determined by the second set of SLI/SLO parameters and/or error budgets 108B. Thus, FIG. 1 illustrates a lack of end to end error-budgeting for the network system 100 as a whole, and thus an error budget definition or measurement in any one sub-domain does not influence a change decision in any other sub-domain. This results in end to end assurance challenges.

The disclosed embodiments propose end to end error budgeting across multiple sub-domains that each use different SLI/SLO parameters (e.g. 108A-D) to ensure that any change decisions made in a given sub-domain consider available error budgets in other sub-domains of the network system 100. For example, as shown in FIG. 1, some embodiments provide an error manager 101 that communicates with each of the sub-domains 102A-D. The error manager 101, as discussed throughout this disclosure, can be considered a group of instructions that configure one or more hardware processors to perform functions attributed to the error manager, as discussed further below.

The error manager 101 integrates performance characterizations of each sub-domain 102A-D to determine an overall characterization of an E2E service chain between the end user devices 104D and the network application 104A. By evaluation of the overall characterization of the E2E service chain, changes to the network system 100 are regulated so as to ensure an end to end application experience meets requirements. To accomplish this, each sub-domain is assigned an error budget, similar to as described above. A representation of accumulated error, generated based on one or more SLIs of the sub-domain, is compared to the error budget to determine a remaining available error budget within the sub-domain. Thus, for example, if a sub-domain has a latency budget of one millisecond, and accumulated latency is determined to be 500 microseconds, the available error budget remaining, with a given measurement time window, is 500 microseconds.

In at least some embodiments, each sub-domain is assigned a weightage (e.g., a sub-domain-specific budget or DS-Budget). A cumulative error budget is then defined for an end to end user/application experience (e.g., for a service chain) that incorporates budgeting from each sub-domain included in the end to end user/application experience or service chain. Using continuous measurement, each DS-budget is measured and adjusted according to its assigned weightage. The weighted measurements are then aggregated (in some embodiments, after a sub-domain specific normalization process is applied to each measured DS-budget) to derive an E2E reliability score. The E2E reliability score is compared to a cumulative error budget that is determined, in at least some embodiments, by aggregating error budgets across the E2E service chain. The E2E reliability score is then included as an input in a closed loop mechanism to influence change decisions occurring in any one of the included sub-domains.

Figure 2:
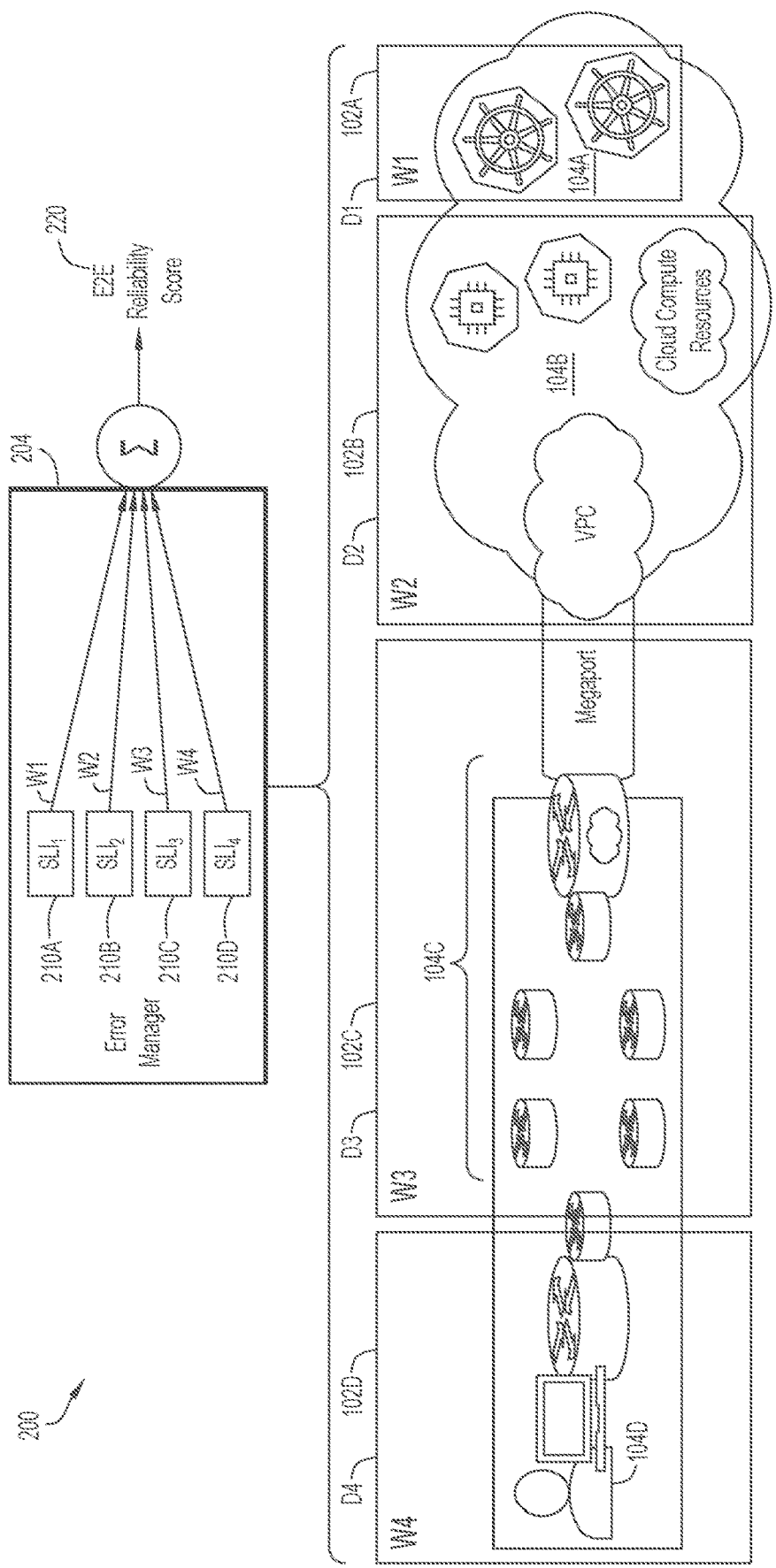
FIG. 2 illustrates an assignment of different weights to different sub-domains of an end to end service chain, according to an example embodiment.

FIG. 2 illustrates an assignment of different weights to different sub-domains of an end to end service chain, according to an example embodiment. FIG. 2 shows a network system 200 including network application 104A included in the first sub-domain 102A. The first sub-domain 102A is assigned a weight of W1. Cloud infrastructure 104B is included in the second sub-domain 102B. The second sub-domain 102B is assigned a weight of W2. Different components of network infrastructure 104C are included in the third sub-domain 102C. The third sub-domain 102C is assigned a weight of W3. End user devices 104D are included in the fourth sub-domain 102D. The fourth sub-domain 102D is assigned a weight of W4. Each of the weights W1, W2, W3, and W4 are, at least in some embodiments, a numerical value. The weights are assigned, in various embodiments, based on a relative importance or priority of the sub-domains 102A-D to the end to end service chain. For example, network application 104A is, in some circumstances, accessed by users from multiple sites/regions and thus has a higher weightage relative to, for example, a weight (e.g., W4) assigned to end user devices in the fourth sub-domain 102D.

FIG. 2 also shows an error manager 204 aggregating SLI information, including SLI information 210A, SLI information 210B, SLI information 210C, and SLI information 210D, of each of the first sub-domain 102A, the second sub-domain 102B, the third sub-domain 102C, and the fourth sub-domain 102D respectively, according to their corresponding weights, to generate an E2E reliability score 220. In embodiments discussed further below, the E2E reliability score 220 is distributed to one or more of the sub-domains 102A-D to allow those sub-domains to make management decisions with a broader context regarding the end to end service chain. Some other embodiments provide for the error manager 204 to approve or deny changes requested by the individual sub-domains 102A-D based on the E2E reliability score as discussed further below.

Figure 3:
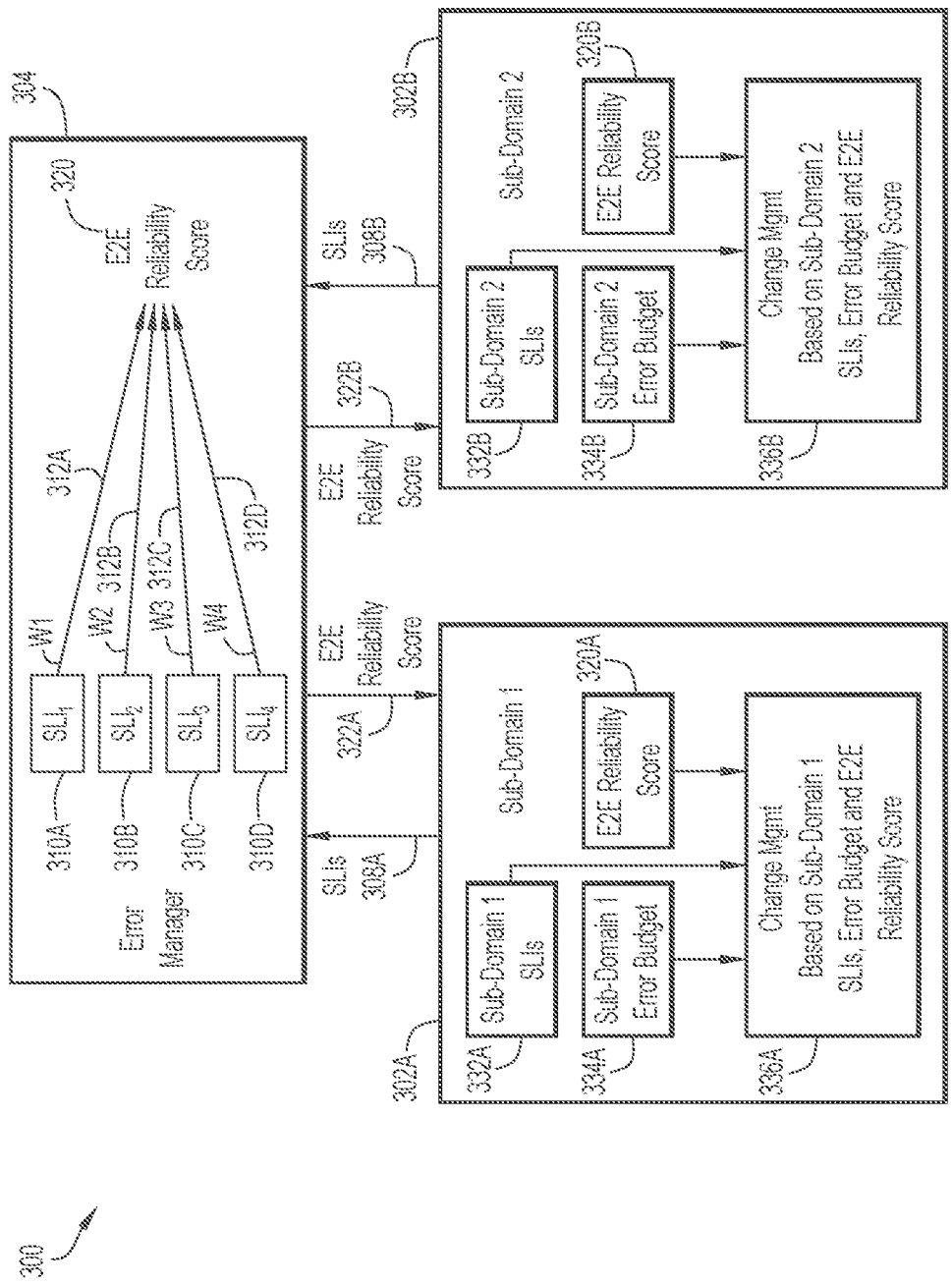
FIG. 3 is another illustration of end to end error budgeting in accordance with an example embodiment.

FIG. 3 is another illustration of E2E error budgeting in accordance with an example embodiment. FIG. 3 illustrates a network system 300 including an error manager 304 in communication with a plurality of sub-domains. In the example of FIG. 3, there are four sub-domains managed by the error manager 304, two of which are shown, the first sub-domain 302A and the second sub-domain 302B. Each sub-domain managed by the error manager 304 provides SLI based information to the error manager 304. FIG. 3 illustrates the first sub-domain 302A sending SLI based information to the error manager 304 via a message 308A. The second sub-domain 302B sends SLI based information to the error manager 304 via a message 308B. In some embodiments, the SLI based information provided to the error manager by the first sub-domain 302A and the second sub-domain 302B is normalized, in that it is converted, by the respective sub-domain, into a common reference plane such that the SLI based information can be aggregated or otherwise operated on by the error manager 304. In other embodiments, the SLI based information is provided in an unnormalized form, and the error manager 304 is responsible for normalizing the SLI based information, as needed, before performing any operations to aggregate the SLI based information.

FIG. 3 illustrates the error manager 304 generating an E2E reliability score 320, based on SLI information provided by each of the four sub-domains managed by the error manager 304. This SLI information is shown as SLI information 310A-D. When generating the E2E reliability score 320, each of SLI information 310A of the first sub-domain 302A, second SLI information 310B of the second sub-domain 302B, third SLI information 310C of a third sub-domain, and fourth SLI information 310D of a fourth sub-domain is adjusted by a respective weight (W1-W4 respectively), identified in FIG. 3 as weight 312A, weight 312B, weight 312C, and weight 312D respectively.

After the error manager 304 generates the E2E reliability score, the E2E reliability score is distributed to one or more of the sub-domains managed by the error manager 304. Accordingly, FIG. 3 illustrates the E2E reliability score 320 being distributed to at least the first sub-domain 302A and the second sub-domain 302B via message 322A and message 322B respectively.

Thus, each of the first sub-domain 302A and the second sub-domain 302B maintain their respective SLI information, shown as first sub-domain SLI information 332A and second sub-domain SLI information 332B. Each of the first sub-domain 302A and the second sub-domain 302B also maintain their respective error budget(s), shown as error budget(s) 334A and error budget(s) 334B respectively. As discussed above, each of the first sub-domain 302A and the second sub-domain 302B receive the E2E reliability score 320 from the error manager 304, and maintain this information as E2E reliability score 320A (as maintained by the first sub-domain 302A) and as E2E reliability score 320B (as maintained by the second sub-domain 302B). Each of the first sub-domain 302A and second sub-domain 302B perform change management process 336A and change management process 336B respectively, which are both based on the SLI information of the respective sub-domain (e.g., the first sub-domain SLI information 332A, and the second sub-domain SLI information 332B), error budget(s) of the respective sub-domain (e.g., error budget(s) 334A for the first sub-domain 302A, and error budget(s) 334B for the second sub-domain 302B), and the E2E reliability information maintained by the respective sub-domain (E2E reliability score 320A as maintained by the first sub-domain 302A and E2E reliability score 320B as maintained by the second sub-domain 302B).

Thus, in the embodiment of FIG. 3, a decision made by a sub-domain to impose a risk of service degradation (e.g., by implementing a new feature or version upgrade), is enhanced via consideration of an end to end error budget. In these embodiments, the end to end error budget and/or margin are provided to one or more sub-domains, such that each of the sub-domains may consider this additional data before making a change decision. When a sub-domain is performing an error budget check before performing a change or feature push, a cumulative or holistic available error budget is considered before any decision is made. Thus, each sub-domain can benefit from SLI/SLO information accumulated within other sub-domains, and distributed by a central intelligence or error manager, in some cases, running within a cloud based environment. This improves decisions made within each sub-domain by providing each sub-domain with a more global context. Changes can then be implemented by a sub-domain with a lower probability of violating constraints of other sub-domains, or an end to end SLO or error budget constraint.

Figure 4:
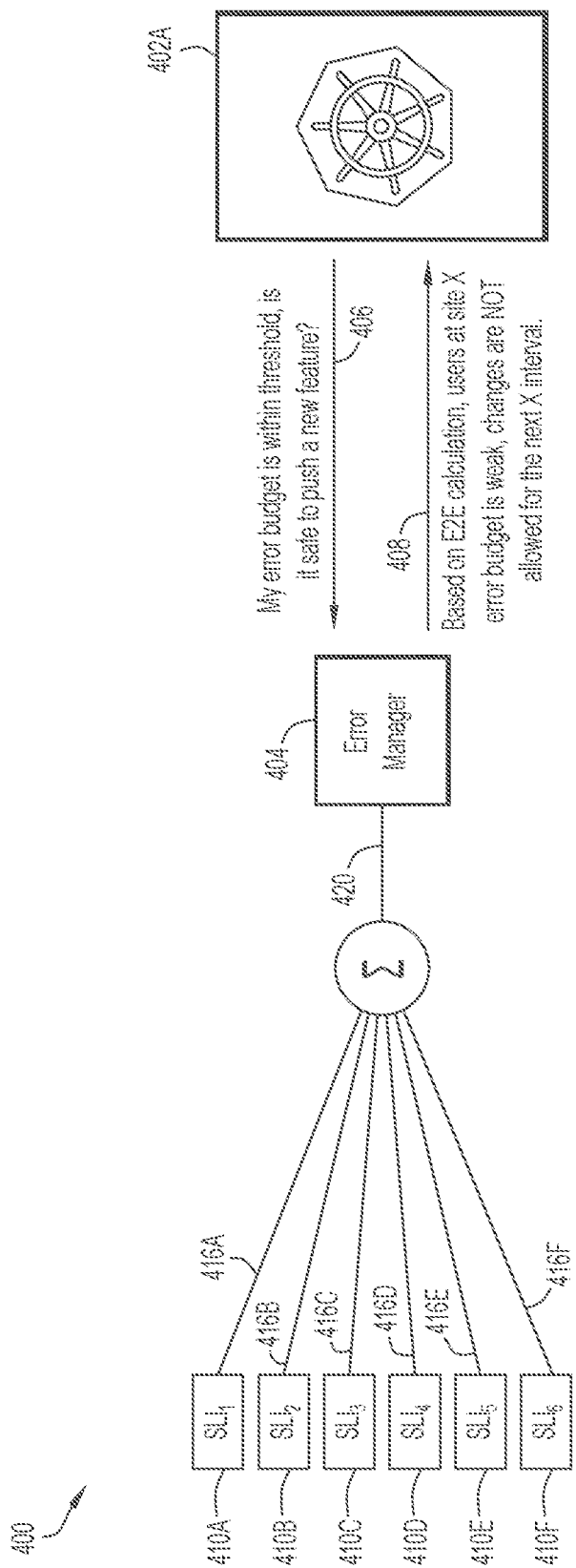
FIG. 4 illustrates distribution of an end to end error budget to individual sub-domains in accordance with an example embodiment.

FIG. 4 illustrates distribution of an end to end error budget to individual sub-domains in accordance with an example embodiment. FIG. 4 shows an error management system 400 processing SLI information received from a plurality of sub-domains. FIG. 4 shows a first sub-domain 402A providing error margin information, which includes one or more of SLI information and/or error budget information of the first sub-domain 402A, to the error manager 404 in a message 406. SLI information received from a plurality of sub-domains (including the first sub-domain 402A) is shown in FIG. 4 as SLI information 410A (denoted as SLI1 in FIG. 4), SLI information 410B, (denoted as SLI2 in FIG. 4), SLI information 410C (denoted as SLI3 in FIG. 4), SLI information 410D, (denoted as SLI4 in FIG. 4), SLI information 410E, (denoted as SLI5 in FIG. 4), and SLI information 410F, (denoted as SLI6 in FIG. 4). The error manager 404 aggregates the SLI information 410A-410F according to their respective weights, shown as a first weight 416A, a second weight 416B, a third weight 416C, a fourth weight 416D, a fifth weight 416E, and a sixth weight 416F. A result of the aggregation is an available end to end error budget 420 (also referred to as an E2E reliability score within this disclosure).

As indicated in FIG. 4, the message 406 also includes a request by the first sub-domain 402A, in some embodiments, for approval to push a new feature. Introduction of a new feature increases a risk that the first sub-domain 402A will cause additional error within an end to end service chain, and thus cause the end to end service change to violate one or more SLOs. In some embodiments, the message 406 also indicates an estimated additional error the proposed change will introduce to the end to end service chain.

When the error manager 404 responds to the message 406 from the first sub-domain 402A, it determines whether the first sub-domain 402A is able to further reduce the available end to end error budget 420. As shown, the error manager 404 indicates, in a message 408, that changes are not allowed. The error manager 404 determines that changes are not allowed based, at least in part, on the available end to end error budget. In some embodiments, as illustrated, the error manager 404 indicates a reason for a denial of the request, such as due to a particular other sub-domain having available error budget meeting a criterion (e.g., less than a predefined threshold). In some embodiments, as illustrated, the error manager 404 also indicates in the message 408 a time interval during which no changes are allowed.

Thus, in the embodiment illustrated by FIG. 4, when one sub-domain (such as a sub-domain including a micro-service) is planning to push a new feature, the sub-domain can consult a central intelligence, such as the error manager 404 of FIG. 4. In FIG. 4, an available error budget of the micro service environment (e.g., the first sub-domain 402A) is well within a threshold. However, the available E2E error budget or end to end reliability score indicates there is not sufficient error margin within the E2E service chain to tolerate the proposed change, while also continuing to meet the SLOs of the E2E service chain. Accordingly, a decision is taken not to implement a planned change.

Figure 5:
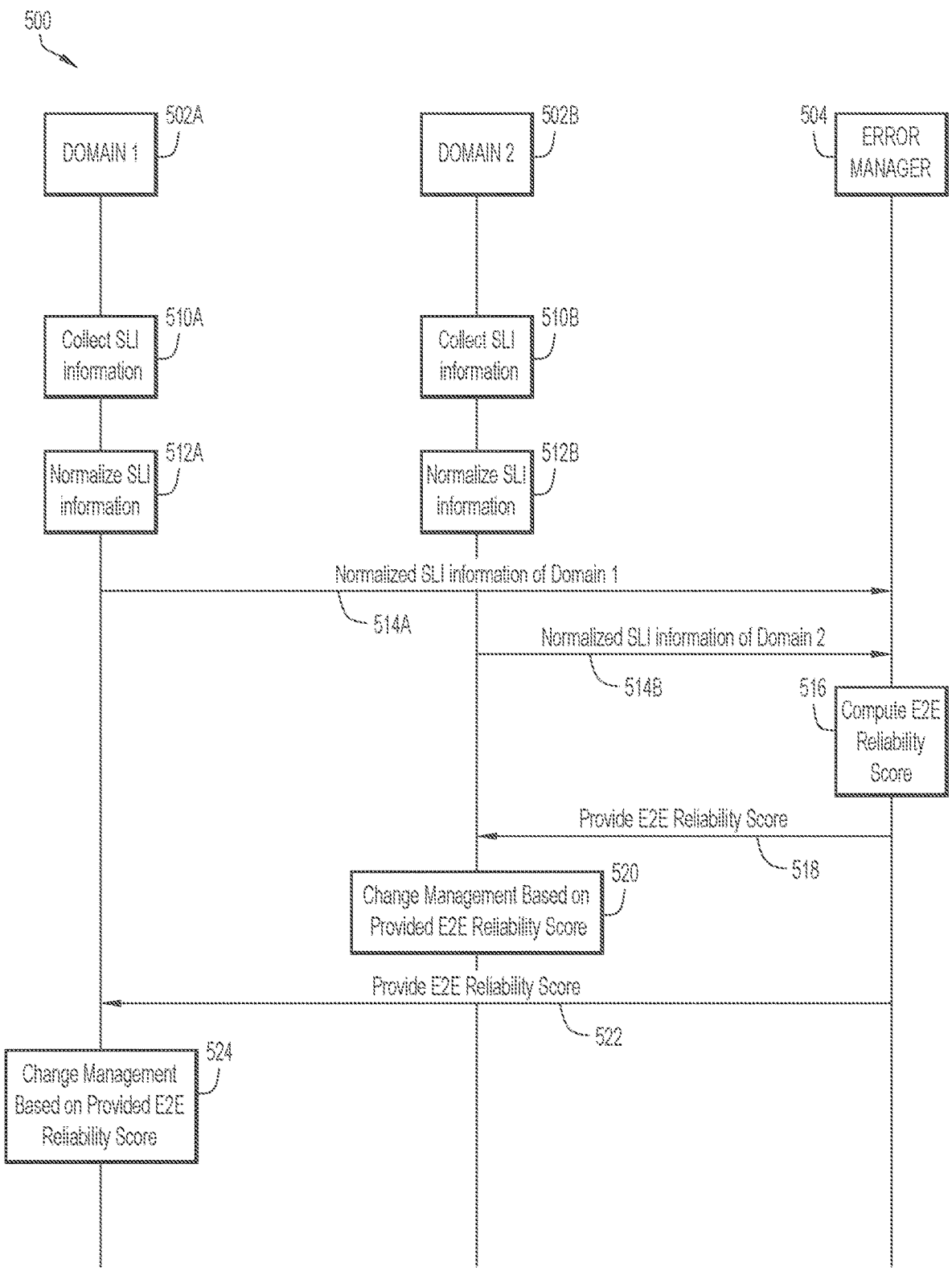
FIG. 5 is a sequence diagram illustrating communication between a first sub-domain, a second sub-domain, and an error manager in accordance with an example embodiment.

FIG. 5 is a sequence diagram 500 illustrating communication between a first sub-domain 502A, a second sub-domain 502B, and an error manager 504 in accordance with an example embodiment. In the embodiment of FIG. 5, normalization of SLI information is performed within each sub-domain. Thus, data provided to the error manager 504 is provided in a normalized form. The normalized data is then aggregated by the error manager 504 to determine an end to end reliability score.

FIG. 5 shows the first sub-domain 502A collecting SLI information in operation 510A. Similarly, the second sub-domain 502B collects SLI information in operation 510B. Note that, in at least some embodiments, each of the first sub-domain 502A and the second sub-domain 502B collect different sets of SLI information to characterize performance within each of their respective sub-domains. In some embodiments, SLI information of the first sub-domain 502A and second sub-domain 502B includes at least some overlap. In some embodiments, criterion used to evaluate the SLI information in each sub-domain is different. Thus, for example, in some embodiments, an acceptable latency measurement in the first sub-domain 502A is considered acceptable or nominal latency, while that equivalent latency measurement, if obtained by the second sub-domain 502B, is considered an error condition.

The first sub-domain 502A is shown normalizing the collected SLI information in operation 512A. The second sub-domain 502B normalizes its respective collected SLI information (e.g., from operation 510B) in operation 512B. Note that normalization in operation 512A is a different operation, in at least some embodiments, than normalization of SLI information of the second sub-domain 502B that is performed in operation 512B. In some embodiments, normalization converts the SLI information collected in, for example, operation 510A and/or operation 510B, to a common reference space or range. For example, in some embodiments, normalization is performed according to Equation 1 below:

$$SLI_{norm} = SLI/SLI\text{Budget} * \text{Norm Range} \quad \text{Eq. (1)}$$

where:
$SLI_{norm}$ is a normalized SLI value,
SLI a service level indicator of a sub-domain,
$SLI_{Budget}$ a maximum allowed value of the SLI, and
Norm Range a value range in a normalized end to end error measurement.

The normalized SLI information of the first sub-domain 502A is provided by the first sub-domain 502A in a communication 514A to the error manager 504. The normalized SLI information of the second sub-domain 502B is provided to the error manager 504 in a communication 514B. The error manager 504 then computes an end to end reliability score in operation 516. In some embodiments, the E2E reliability score is computed via an aggregation of the normalized SLI information provided by each of the first sub-domain 502A and the second sub-domain 502B (and any other sub-domains, not shown). In some embodiments, each normalized error budget is adjusted by a weight assigned to the sub-domain when computing the end to end reliability score. Thus, some embodiments compute an E2E reliability score according to Equation 2 below:

$$E2E\text{score} = \sum_{n=1}^{n=numDomains} \text{Norm}_n(SLI_n) * W_n \quad \text{Eq. (2)}$$

where:
numDomains is a number of sub-domains within an end to end network system,
$\text{norm}_n()$ is a normalization function for sub-domain n,
$SLI_n$ is a service level indicator for a sub-domain n,
$W_n$ a weightage assigned to a sub-domain n The error manager 504 then distributes the E2E reliability score to the second sub-domain 502B via communication 518. The second sub-domain 502B then utilizes the E2E reliability score, along with its own SLI information, to determine, in operation 520, whether to perform change operations within the second sub-domain. For example, in some embodiments, the second sub-domain 502B upgrades one or more software or hardware components of the second sub-domain 502B if the E2E reliability score and/or the SLI information of the second sub-domain 502B satisfy corresponding criterion.

The error manager 504 is also shown distributing the E2E reliability score to the first sub-domain 502A via communication 522. The first sub-domain 502A also performs change management, in operation 524, based on the provided E2E reliability score provided by the error manager 504, and based, at least in part, on its own SLI measurements and/or normalized SLI measurements. For example, in some embodiments, the first sub-domain 502A determines a minimum error budget remaining both within the first sub-domain 502A itself, and also as indicated by the E2E reliability score provided by the error manager. The first sub-domain 502A also then estimates an amount of error budget necessary to perform a particular change. The first sub-domain 502A then relates the minimize error budget to the estimate to determine whether the change will be initiated. In some embodiments, a margin of error is also included in a calculation. Thus, for example, in some embodiments, an equation such as Equation 3 is used to determine whether a change can be performed given a local, sub-domain specific error budget and an end to end reliability score:

$$\min(\text{norm}(ebudget_d), E2E \text{ score}) - \text{margin} > \text{estimate}_c \quad \text{Eq (3)}$$

where:
min( ) a function that returns the minimum of two values,
norm( ) a function that normalizes an error budget of a sub-domain,
$ebudget_d$ an error budget of a sub-domain d,
E2E score is an E2E reliability score provided by an error manager, and
margin an amount of margin between an expected error imposed by a change, and an allowable amount of error in an end to end system.

Thus, in some embodiments, if Equation 3 evaluates to a true value, a change can proceed, whereas if Equation 2 evaluates to a false value, the change is not allowed.

Figure 6:
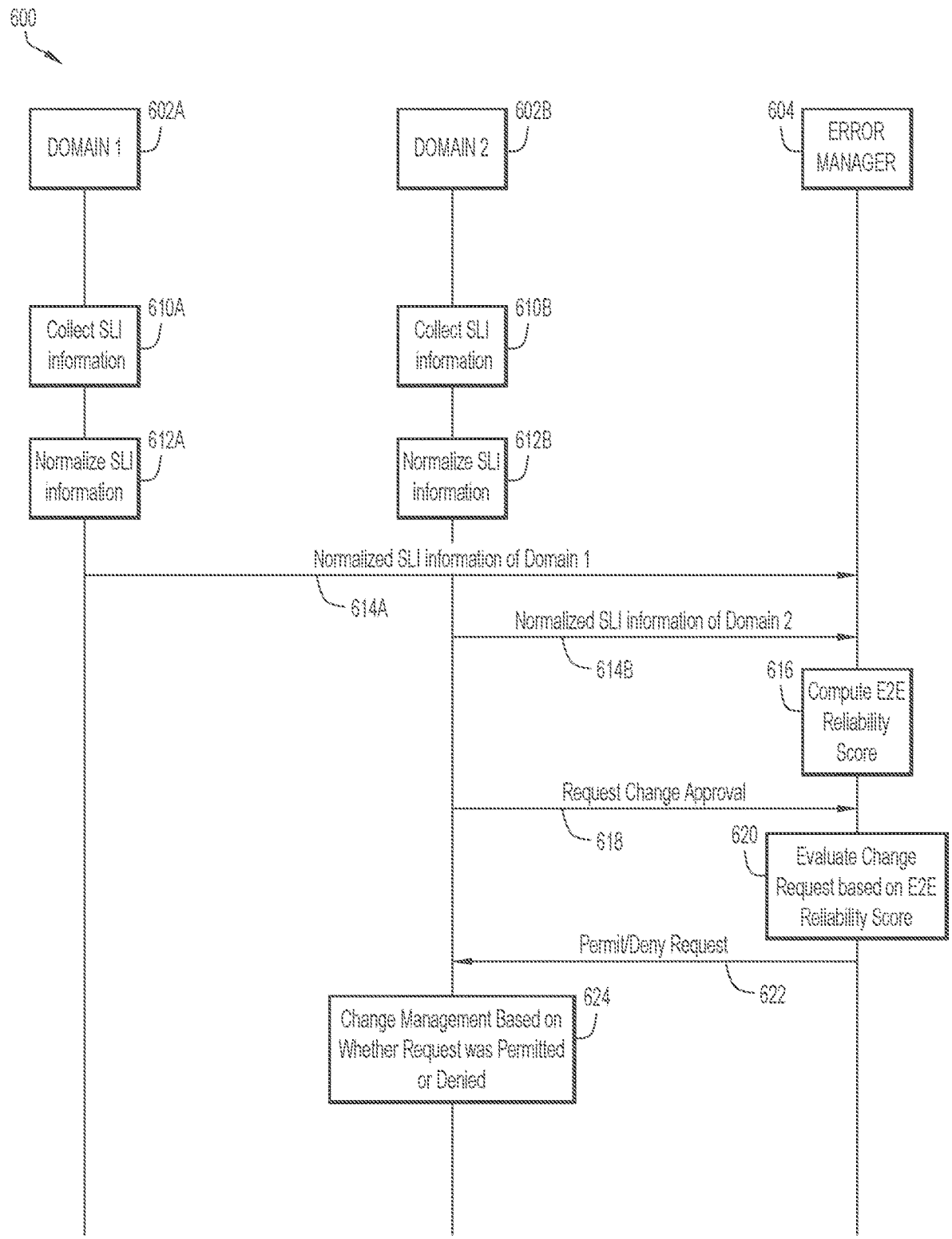
FIG. 6 is a sequence diagram illustrating an error manager that evaluates a request for a change from a sub-domain, in accordance with an example embodiment.

FIG. 6 is a sequence diagram 600 illustrating an error manager that evaluates a request for a change from a sub-domain, in accordance with an example embodiment. FIG. 6 illustrates a first sub-domain 602A, a second sub-domain 602B, and an error manager 604. FIG. 6 also shows the first sub-domain 602A collecting SLI information in operation 610A, and the second sub-domain 602B collecting SLI information in operation 610B. FIG. 6 also shows the first sub-domain 602A normalizing its respective SLI information in operation 612A, and the second sub-domain 602B normalizing its respective SLI information in operation 612B. In some embodiments, the normalization is performed according to Equation 1 discussed above with respect to FIG. 5. Each of the normalized SLI information is provided by the first sub-domain 602A and the second sub-domain 602B via communications 614A and 614B respectively to the error manager 604. The error manager 604 then computes, in operation 616, an E2E error budget based on at least the normalized SLI information provided in the communication 614A and the communication 614B. In some embodiments, the E2E error budget computed in operation 616 is performed in accordance with Equation 2, discussed above with respect to FIG. 5. For example, in some embodiments, each sub-domain's normalized SLI information is adjusted according to a weightage assigned to the respective sub-domain. The weighted SLI information is then aggregated when determining the E2E error budget.

FIG. 6 illustrates the second sub-domain 602B requesting, via communication 618, approval for a change to the error manager 604. The request for approval, in some embodiments, indicates an amount of error estimated (by the second sub-domain) to be introduced by the change. In operation 620, the error manager 604 evaluates the request for approval provided by the second sub-domain 602B. In some embodiments, the error manager 604 relies on Equation 3, discussed above with respect to FIG. 3, to determine whether to allow the request or deny the request.

FIG. 6 illustrates the error manager 604 indicating, via communication 622, whether the second sub-domain 602B request for a change approval is permitted or denied (e.g., based on the results of Equation 3 in some embodiments). In operation 624, the second sub-domain 602B then performs the change conditioned on the permitting of the request by the error manager 604. In some embodiments, the change selectively performed by the second sub-domain 602B relates to installation or upgrade of one or more hardware and/or software components included in the second sub-domain 602B.

Figure 7:
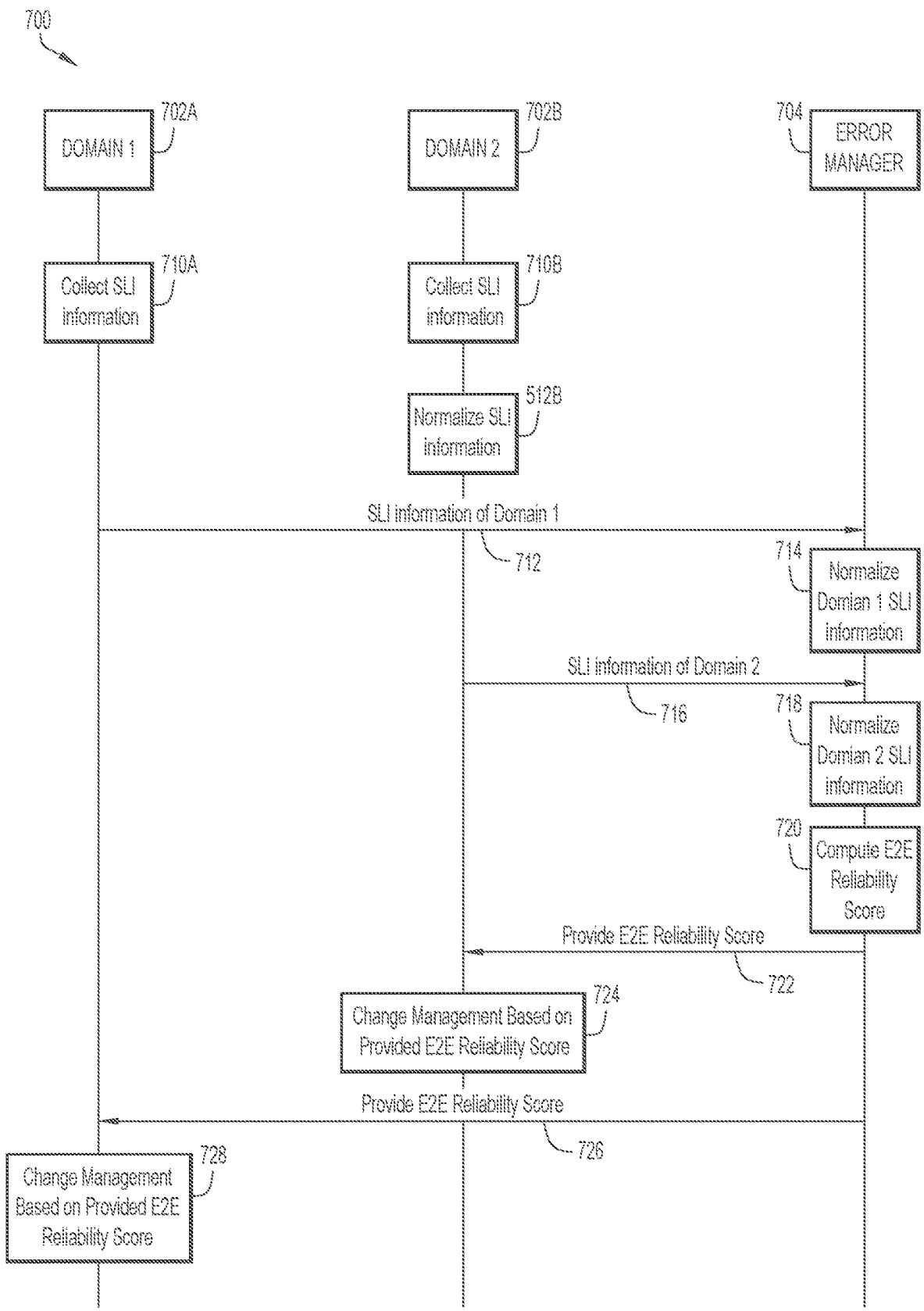
FIG. 7 is a sequence diagram illustrating normalization of SLI information by an error manager, in accordance with an example embodiment.

FIG. 7 is a sequence diagram 700 illustrating normalization of SLI information by an error manager, in accordance with an example embodiment. FIG. 7 shows a first sub-domain 702A, a second sub-domain 702B, and an error manager 704. The first sub-domain collects SLI information in operation 710A, and the second sub-domain collects SLI information in operation 710B. The SLI information of the first sub-domain 702A is sent to the error manager 704 in communication 712. The error manager 704 then normalizing the SLI information of the first sub-domain 702A in operation 714. Note that in order to normalizing the SLI information of the first sub-domain 702A, the error manager 704 includes normalization logic or algorithms that are specific to characteristics of the first sub-domain 702A and/or the collected SLI information of the first sub-domain.

FIG. 7 also shows the second sub-domain 702B providing the SLI information collected in operation 710B to the error manager 704 via communication 716. The error manager 704 then normalizes the SLI information provided by the second sub-domain 702B in the operation 718. The normalization process performed by the operation 718 is, in at least some embodiments, different from the normalization process performed by the operation 714, which normalized SLI information of the first sub-domain 702A. This is a result of each of the first sub-domain 702A and the second sub-domain 702B selecting a different set of operational parameter values to measure/collect in order to determine operational performance of the respective sub-domain. Furthermore, each of the first sub-domain 702A and the second sub-domain 702B may operate under differing SLO parameters. As a result of these differences, different normalization processes are performed by the error manager 704. The normalization is performed, in at least some embodiments, such that the SLI information of the first sub-domain 702A and the second sub-domain 702B are then aggregated to generate an E2E reliability score that accurately reflects an amount of error experienced and available within an end to end service chain of a network system. Thus, FIG. 7 shows the error manager 704 computing an end to end reliability score in operation 720, and providing the E2E reliability score via communication 722, to the second sub-domain 702B. The second sub-domain 702B then performs, in operation 724, change management (e.g., determining whether to install, remove, or upgrade hardware and/or software components), based, at least in part, on the E2E reliability score and its own local SLI information. FIG. 7 also illustrates the error manager 704 providing the E2E reliability score to the first sub-domain 702A via communication 726. After receiving the E2E reliability score from the error manager 704, the first sub-domain 702A performs, in operation 728, change management based at least in part on SLI information of the first sub-domain 702A and the provided E2E reliability score.

Figure 8:
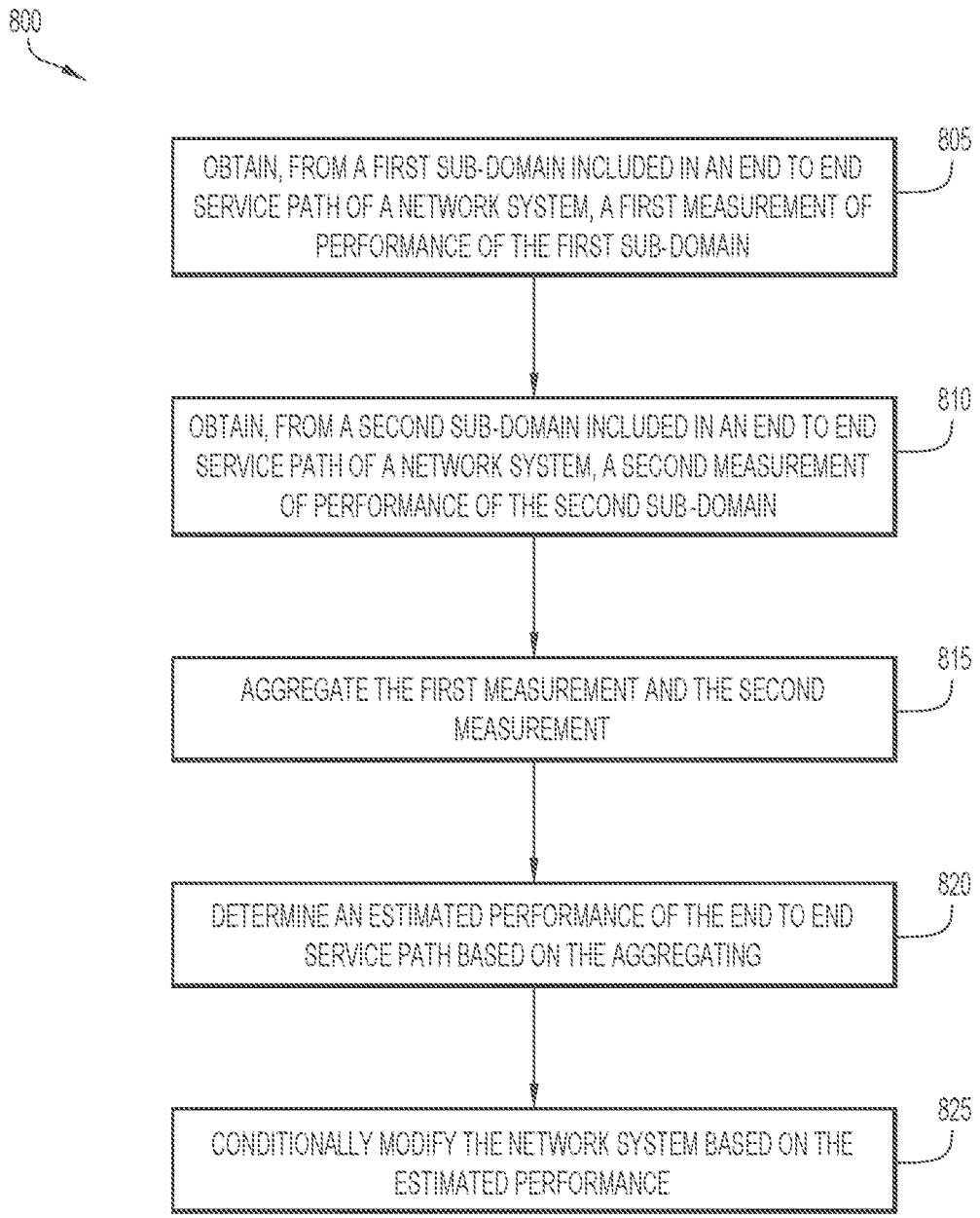
FIG. 8 is a flowchart of a method of end to end error budgeting, according to an example embodiment.

FIG. 8 is a flowchart of a method of end to end error budgeting, according to an example embodiment. In some embodiments, the method 800 of FIG. 8 is performed by an error manager, such as any of the error managers discussed above. In some embodiments, the method 800 is performed by a combination of an error manager and one or more sub-domains (e.g., a domain management system of the sub-domain(s)). In some embodiments, performance by a sub-domain includes performance of the function by a computing device included in the sub-domain, such a management service or other node tasked with managing SLI/SLO information for the sub-domain.

In operation 805, a first measurement of performance of a first subdomain is obtained. The first sub-domain is included in an end to end service path of a network system. For example, the end to end service is, in some embodiments, between a user or group of users located within a particular geographic region, and an application service providing particular application services to that group of users. The first measurement of performance can take a variety of forms, but generally is based on a first plurality of operational parameter values (e.g., SLIs) of the first sub-domain. For example, the first measurement of performance indicates, in some embodiments, an amount of remaining error budget of the first sub-domain within a current measurement time period. In some embodiments, the first measurement of performance indicates a percentage of remaining error budget remaining within the current measurement time period.

In some embodiments, the first measurement of performance is a normalized measurement of performance. The normalization is performed, in various embodiments, by the first sub-domain, an error manager, or another computing device. Thus, in some embodiments, operation 805 includes receiving an unnormalized first measurement from the first sub-domain, and normalizing the first measurement. In other embodiments, the first measurement is received from the first sub-domain in a normalized form.

The normalization of the first measurement translates the first measurement to a measurement scale or plane that is consistent across multiple sub-domains (e.g., via Equation 1 discussed above). The normalization of the first measurement is also specific to the first sub-domain, in that the first sub-domain measures its own performance according to a set of operational parameter values (e.g. SLIs) and SLOs that are custom or specific of the first sub-domain. Thus, a normalization process or normalization method translates these specific operational parameter values (e.g. one or more SLIs) to a common measurement scale that can be used to compare, relate, or aggregate measurements across sub-domains. The normalization process or method is specifically tailored to how the first sub-domain measures its own performance, which is, at least in some embodiments, different in at least one respective from how other sub-domains measure their respective performance. Thus, the normalization of the first measurement facilitates comparing and/or aggregating performance measurements of multiple sub-domains (including the first sub-domain).

In operation 810, a second measurement of performance of a second sub-domain is obtained. The second sub-domain is also included in the end to end service chain. Similar to the first performance measurement discussed above with respect to operation 805, the second measurement of performance is based on a second plurality of operational parameter values (e.g., SLIs) of the second sub-domain. In some embodiments, the second measurement of performance is received, (e.g., by an error manager) from the second sub-domain in a normalized form. In other embodiments, the second measurement of performance is received from the second sub-domain in an unnormalized form and is then normalized (e.g., by the error manager). Similar to the normalization method of the first measurement of performance discussed above with respect to operation 805, the normalization process or normalization method used to normalize the second measurement of performance is specific to the second sub-domain, in that the second sub-domain utilizes a different set of SLIs (e.g., operational parameter values) and/or different criterion and/or error budget(s) relative to other sub-domains, such as the first sub-domain.

In operation 815, the first measurement of performance and the second measurement of performance are aggregated. In some embodiments, aggregation of performance measurements includes adding or multiplying the performance measurements. In some embodiments, each performance measurement is adjusted by a weight assigned to the respective sub-domain associated with the performance measurement before the aggregation occurs. Thus, some embodiments assign weights to sub-domains included in an end to end service chain, and adjust a normalized performance measurement of the sub-domain based on its respective weight.

In operation 820, an estimated performance of the end to end service path is determined based on the aggregation of operation 815. In some embodiments, the estimated performance is the end to end reliability score discussed above, for example, with respect to at least FIGS. 3-7. In some embodiments, the estimated performance (e.g., the E2E reliability score) is provided to at least one of the first sub-domain and/or second sub-domain.

Operation 825 conditionally modifies a network system that includes the end to end service path based on the estimated performance. For example, as discussed above, a sub-domain determines whether to initiate a change within the sub-domain (e.g., an installation, removal, or upgrade of a hardware and/or software component) based on the estimated performance of the end to end service path, and a local estimate of the sub-domain's own performance as assessed by the sub-domain itself. Thus, for example as discussed with respect to the embodiment of FIG. 5 above, in some embodiments, an error manager determines an end to end reliability score, and shares the end to end reliability score with one more sub-domains with the end to end service path. The sub-domain then determines whether to initiate the change based on the provided end to end reliability score (e.g., via Equation 3 above, at least in some embodiments). In other embodiments, the error manager does not share the E2E reliability score with the individual sub-domains, but instead, a sub-domain requests approval to initiate a change from the error manager. In some embodiments, the sub-domain also provides, along with the request, an estimated error to be introduced by the change (e.g. in terms of additional latency, dropped packets, or other additional source of error) to the error manager. The error manager, upon receiving the request, considers the request in the context of the end to end reliability score. In some embodiments, the error manager relies on Equation 3, or an analogous variation, when determining whether to selectively authorize the change request from the sub-domain. The error manager then responds to the request accordingly. The sub-domain then takes action based on whether its request was permitted or denied, without necessarily having visibility into the end to end reliability score generated by the error manager.

In some embodiments, the error manager receives requests for changes from multiple sub-domains. Each of the multiple sub-domains may supply its own estimate of how much additional error will be incurred as a result of the change for which it requests approval. The error manager then considers these multiple requests to determine which, if any, of the requests are granted. In some embodiments, a priority is assigned to each sub-domain, and the change requests granted according to priority, assuming the error that will be introduced fits within an available error budget of the end to end service chain, as indicated by the E2E reliability score. In some embodiments, the priority is adjusted to implement a round robin allocation of request granting. For example, a number of elapsed time periods since a change request was approved for the sub-domain is considered, in some embodiments, when determining to which sub-domain a change request is granted. Thus, a first sub-domain without a recently approved change request receives, in some embodiments, preferential allocation of error relative to a second sub-domain that more recently performed a change (and introduced some error into the end to end service chain as a result).

Some embodiments of method 800 are performed with respect to a given time window. Thus, the first measurement and second measurement indicate performance of the first and second sub-domain respectively within that given time window. The end to end reliability score also relates to end to end performance of the service chain during the given time window, and the modification is scheduled to occur, and if appropriate, does occur, during the given time window. Some embodiments then perform method 800 iteratively over a plurality of different time windows. These time window(s) are predefined time windows, in at least some embodiments, in that the definition of the time windows is based, in at least some embodiments, on a fixed periodicity of iteration of method 800. For example, method 800 operates, in some embodiments, within iterative time windows having a duration of ten seconds, thirty seconds, or one minute in some embodiments, although method 800 is not limited to these example time window durations. Each time window in which the method 800 iterates generally will not overlap, but instead represent discrete independent periods of time where SLIs are collected, remaining error budgets and an E2E reliability score determined, and changes implemented if appropriate.

Figure 9:
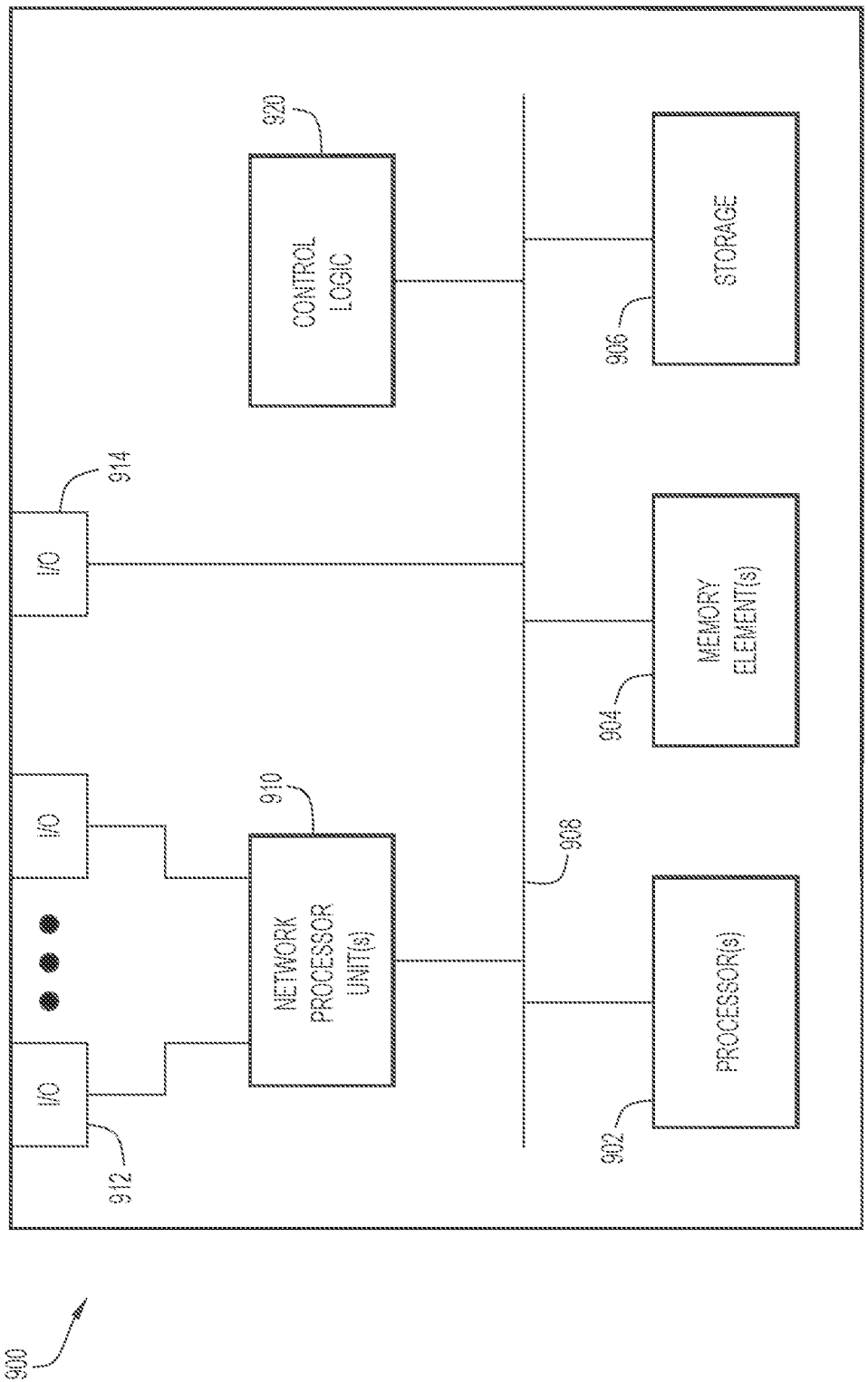
FIG. 9 is a hardware block diagram of a device that performs functions associated with operations discussed herein in connection with the techniques depicted in any one or more of FIGS. 1-8.

FIG. 9 is a hardware block diagram of a device 900 that may perform functions associated with operations discussed herein in connection with the techniques depicted in any one or more of FIGS. 1-8. In various embodiments, any of the components described above (e.g., an error manager, or a sub-domain management system) include, in some embodiments, a computing architecture analogous to that described below with respect to the device 900.

In at least one embodiment, the device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for device 900 can overlap in any manner and are not limited to the specific allocation of instructions and/or operations described herein.

In at least one embodiment, processor(s) 902 is/are at least one hardware processor configured to execute various tasks, operations and/or functions for device 900 as described herein according to software and/or instructions configured for device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with device 900, and/or logic configured for memory element(s) 904 and/or storage 906. For example, any logic described herein (e.g., control logic 920) can, in various embodiments, be stored for device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of device 900 to communicate in order to exchange information and/or data. Bus 908 can be implemented with any architecture designed for passing control, data and/or information between processors, memory elements/storage, peripheral devices, and/or any other hardware and/or software components that may be configured for device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between device 900 and other systems, devices, or entities, via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 900 and other systems, devices, or entities to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to device 900. For example, I/O interface(s) 914 may provide a connection to external devices such as a keyboard, keypad, a touch screen, and/or any other suitable input and/or output device now known or hereafter developed. This may be the case, in particular, when the device 900 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 900 serves as a user device as described herein.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/fifth generation (5G)/next generation (nG), Institute of Electrical and Electronics Engineers (IEEE) 802.11, Wi-Fi®/Wi-Fi6®, IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided that comprises obtaining, from a first sub-domain included in an end to end service chain of a network system, a first measurement of performance of the first sub-domain, obtaining, from a second sub-domain included in the end to end service chain, a second measurement of performance of the second sub-domain, aggregating the first measurement and the second measurement, determining an estimated performance of the end to end service chain based on the aggregating, and conditionally modifying the network system based on the estimated performance.

In another form, an apparatus is provided that comprises a network interface configured to enable network communications, one or more processors, and one or more memories storing instructions that when executed configure the one or more processors to perform operations comprising obtaining, from a first sub-domain included in an end to end service chain of a network system, a first measurement of performance of the first sub-domain, obtaining, from a second sub-domain included in the end to end service chain, a second measurement of performance of the second sub-domain, aggregating the first measurement and the second measurement, determining an estimated performance of the end to end service chain based on the aggregating, and conditionally modifying the network system based on the estimated performance.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, from a first sub-domain included in an end to end service chain of a network system, a first measurement of performance of the first sub-domain;
   obtaining, from a second sub-domain included in the end to end service chain, a second measurement of performance of the second sub-domain;
   aggregating the first measurement and the second measurement;
   determining an estimated performance of the end to end service chain based on the aggregating;
   receiving a request from the first sub-domain to alter a configuration of the first sub-domain; and
   conditionally modifying the network system based on the estimated performance, including responding to the first sub-domain with a denial of the request,
   wherein the denial of the request includes an indication of a time interval during which no changes to the configuration of the first sub-domain are permitted,
   wherein the aggregating of the first measurement and the second measurement comprises adjusting the first measurement by a first weight assigned to the first sub-domain and adjusting the second measurement by a second weight assigned to the second sub-domain.

2. The method of claim 1, further comprising:
   determining a remaining error budget of the end to end service chain based on the estimated performance; and
   providing, to the first sub-domain, the remaining error budget to the first sub-domain.

3. The method of claim 1, wherein the first measurement and the second measurement are associated with a predefined time window, and the conditionally modifying occurs within the predefined time window.

4. The method of claim 1, wherein the first measurement is based on a first plurality of operational parameter values of the first sub-domain, and the second measurement is based on a second plurality of operational parameter values of the second sub-domain, the first plurality of operational parameter values being different from the second plurality of operational parameter values.

5. The method of claim 1, further comprising providing the estimated performance of the end to end service chain to the first sub-domain.

6. The method of claim 1, wherein the denial of the request includes a reason for the denial of the request.

7. A method comprising:
   obtaining, from a first sub-domain included in an end to end service chain of a network system, a first measurement of performance of the first sub-domain;
   obtaining, from a second sub-domain included in the end to end service chain, a second measurement of performance of the second sub-domain;
   aggregating the first measurement and the second measurement;
   determining an estimated performance of the end to end service chain based on the aggregating;
   receiving a request from the first sub-domain to alter a configuration of the first sub-domain; and
   conditionally modifying the network system based on the estimated performance, including responding to the first sub-domain with a denial of the request,
   wherein the denial of the request includes an indication of a time interval during which no changes to the configuration of the first sub-domain are permitted,
   wherein the first sub-domain utilizes a first normalization method to generate the first measurement and the second sub-domain utilizes a second normalization method to generate the second measurement.

8. A method comprising:
   obtaining, from a first sub-domain included in an end to end service chain of a network system, a first measurement of performance of the first sub-domain;
   obtaining, from a second sub-domain included in the end to end service chain, a second measurement of performance of the second sub-domain;
   aggregating the first measurement and the second measurement;
   determining an estimated performance of the end to end service chain based on the aggregating;

receiving a request from the first sub-domain to alter a configuration of the first sub-domain; and conditionally modifying the network system based on the estimated performance, including responding to the first sub-domain with a denial of the request, wherein the denial of the request includes an indication of a time interval during which no changes to the configuration of the first sub-domain are permitted, wherein the conditionally modifying the network system comprises selectively authorizing an installation or upgrade of a software component within the first sub-domain based on the estimated performance.

9. A method comprising:

obtaining, from a first sub-domain included in an end to end service chain of a network system, a first measurement of performance of the first sub-domain;

obtaining, from a second sub-domain included in the end to end service chain, a second measurement of performance of the second sub-domain;

aggregating the first measurement and the second measurement;

determining an estimated performance of the end to end service chain based on the aggregating;

receiving a request from the first sub-domain to alter a configuration of the first sub-domain; and conditionally modifying the network system based on the estimated performance, including responding to the first sub-domain with a denial of the request, wherein the denial of the request includes an indication of a time interval during which no changes to the configuration of the first sub-domain are permitted, the method further comprising receiving, from the first sub-domain, a first request to reduce a first performance of the first sub-domain; and conditionally granting the first request based on the estimated performance.

10. The method of claim 9, wherein the first request indicates an amount of reduction in the first performance of the first sub-domain, and the method further comprises comparing the amount of reduction to the estimated performance, and wherein the conditionally granting is based on the comparing.

11. An apparatus comprising:

a network interface configured to enable network communications;

one or more processors, and one or more memories storing instructions that when executed configure the one or more processors to perform operations comprising:

obtaining, from a first sub-domain included in an end to end service chain of a network system, a first measurement of performance of the first sub-domain;

obtaining, from a second sub-domain included in the end to end service chain, a second measurement of performance of the second sub-domain;

aggregating the first measurement and the second measurement;

determining an estimated performance of the end to end service chain based on the aggregating;

receiving a request from the first sub-domain to alter a configuration of the first sub-domain; and conditionally modifying the network system based on the estimated performance, including responding to the first sub-domain with a denial of the request, wherein the denial of the request includes an indication of a time interval during which no changes to the configuration of the first sub-domain are permitted, and wherein the first sub-domain utilizes a first normalization method to generate the first measurement and the second sub-domain utilizes a second normalization method to generate the second measurement.

12. The apparatus of claim 11, wherein the aggregating of the first measurement and the second measurement comprises adjusting the first measurement by a first weight assigned to the first sub-domain and adjusting the second measurement by a second weight assigned to the second sub-domain.

13. The apparatus of claim 12, the operations further comprising:

determining a remaining error budget of the end to end service chain based on the estimated performance; and providing, to the first sub-domain, the remaining error budget to the first sub-domain.

14. The apparatus of claim 11, wherein the first measurement is based on a first plurality of operational parameter values of the first sub-domain, and the second measurement is based on a second plurality of operational parameter values of the second sub-domain, the first plurality of operational parameter values being different from the second plurality of operational parameter values.

15. A non-transitory computer readable storage medium comprising instructions that when executed configure one or more processors to perform operations, comprising:

obtaining, from a first sub-domain included in an end to end service chain of a network system, a first measurement of performance of the first sub-domain;

obtaining, from a second sub-domain included in the end to end service chain, a second measurement of performance of the second sub-domain;

aggregating the first measurement and the second measurement;

determining an estimated performance of the end to end service chain based on the aggregating;

receiving a request from the first sub-domain to alter a configuration of the first sub-domain; and conditionally modifying the network system based on the estimated performance, including responding to the first sub-domain with a denial of the request, wherein the denial of the request includes an indication of a time interval during which no changes to the configuration of the first sub-domain are permitted, wherein the aggregating of the first measurement and the second measurement comprises adjusting the first measurement by a first weight assigned to the first sub-domain and adjusting the second measurement by a second weight assigned to the second sub-domain.

16. The non-transitory computer readable storage medium of claim 15, the operations further comprising:

determining a remaining error budget of the end to end service chain based on the estimated performance; and providing, to the first sub-domain, the remaining error budget to the first sub-domain.

17. The non-transitory computer readable storage medium of claim 15, the operations further comprising receiving, from the first sub-domain, a first request to reduce a first performance of the first sub-domain; and conditionally granting the first request based on the estimated performance, wherein the first request indicates an amount of reduction in the first performance of the first sub-domain, and the operations further comprise comparing the amount of reduction to the estimated performance, and wherein the conditionally granting is based on the comparing.

* * * * *